United States Patent [19]

De Busscher et al.

[11] 4,310,004
[45] Jan. 12, 1982

[54] COMBINE HARVESTER RETHRESHER

[75] Inventors: Cyriel R. J. De Busscher, Sijsele-Damme; Francois Van Herpe, Houtem, both of Belgium

[73] Assignee: Sperry Corporation, New Holland, Pa.

[21] Appl. No.: 165,151

[22] Filed: Jul. 1, 1980

[30] Foreign Application Priority Data

Jul. 6, 1979 [GB] United Kingdom ............... 23773/79

[51] Int. Cl.³ ........................ A01F 12/26; A01F 12/18
[52] U.S. Cl. .................................. 130/27 F; 130/27 M
[58] Field of Search ......... 56/14.6; 130/27 F, 27 HA, 130/27 Q, 27 P, 27 H, 27 M

[56] References Cited

U.S. PATENT DOCUMENTS

| 547,813 | 10/1895 | Snyder | 130/27 HA |
|---|---|---|---|
| 551,500 | 12/1895 | Landis | 130/27 F |
| 788,088 | 4/1905 | Berndt | 130/27 HA |
| 990,284 | 4/1911 | Miller | 130/27 Q |
| 2,875,768 | 3/1959 | Belkowski et al. | 130/27 F |
| 2,906,270 | 9/1959 | Buchele | 130/27 M |
| 2,974,668 | 3/1961 | Witzel | 130/27 M |
| 3,115,142 | 12/1963 | Kepkay | 130/27 F |
| 3,529,645 | 9/1970 | Murray et al. | 130/27 T |
| 3,664,100 | 5/1972 | Rowland-Hill | 130/27 HA |
| 4,062,366 | 12/1977 | De Coene | 130/27 F |
| 4,139,013 | 2/1979 | Hewgen | 130/27 H |
| 4,249,542 | 2/1981 | Schuler | 130/27 T |

FOREIGN PATENT DOCUMENTS

| 303649 | 2/1918 | Fed. Rep. of Germany | 130/27 F |
|---|---|---|---|
| 1632827 | 8/1976 | Fed. Rep. of Germany | 130/27 F |
| 1257037 | 2/1961 | France | 130/27 F |
| 919327 | 2/1963 | United Kingdom | 130/27 F |

*Primary Examiner*—Paul J. Hirsch
*Attorney, Agent, or Firm*—James R. Bell; Frank A. Seemar

[57] ABSTRACT

A combine harvester includes an auger, a rethresher rotor and an impeller for transferring crop material from the auger to the rethresher. A shaft, rotatably mounted in the harvester, carries the auger, the impeller and the rotor.

4 Claims, 3 Drawing Figures

COMBINE HARVESTER RETHRESHER

BACKGROUND OF THE INVENTION

This invention relates generally to threshing and more particularly to threshing machines having a rethresher cylinder of the rasp type.

While the terms "grain", "straw", and "tailings" are used principally throughout this specification for convenience, it should be understood that these terms are not intended to be limiting. Thus "grain" refers to that part of the crop material which is threshed and separated from the discardable part of the crop material which is referred to as "straw". Incompletely threshed ears are referred to as "tailings". Also, the terms "forward", "rearward", "left", "right", etc. when cited in connection with the combine harvester and/or components thereof are determined with reference to the forward operative travel of the combine harvester in the field and should not be understood to be limiting.

In known combine harvesters, grain is threshed and separated in a threshing and separating mechanism and the separated grain, together with impurities of all sorts, such as chaff, dust, straw particles, tailings, is fed to a cleaning mechanism for cleaning. Clean grain is collected and fed to a graintank for temporary storage. The tailings are separated from the clean grain and impurities for reprocessing. This reprocessing either means recycling the tailings through the threshing and separating mechanism or treating them in a separate tailings rethreshing means. In both cases the tailings are conveyed through an elevator which usually is of the paddle type.

In combine harvesters, independent tailings rethreshers have been provided which are normally arranged to receive the tailings from the cleaning mechanism and to discharge the rethreshed tailings onto the grain pan of said cleaning mechanism for recycling the tailings therethrough. This arrangement is advantageous in as far as the main threshing and separating mechanism can be used to its full capacity without any risks for unevenly loading or overloading it with tailings. These separate tailings rethreshers have proven to be advantageous especially in combination with high capacity combine harvesters since they enable components to operate with a maximum efficiency.

Nevertheless, these separate tailings rethreshers also have some limitations, one of the major ones thereof being that certain embodiments are complicated and hence expensive. One such embodiment combines a conventional type elevator with rethresher means. Another embodiment combines rethresher means with a vertical auger for feeding the tailings to the rethresher on top thereof. This structure is driven via a drive transmission including conical gears which add to the expense. In the latter arrangement tailings are not forcefully moved through the entire length of the tailings rethreshing means in the rethresher and hence a certain percentage of tailings is discharged from the rethresher prematurely, whereby these tailings once again have to pass through the rethresher after separation in the cleaning mechanism.

All known tailings rethreshers comprise a rotor cooperable with a stationary elements to rethresh the tailings on the one hand, and operable to discharge the rethreshed tailings and spread them substantially evenly over the grain pan on the other hand. Therefore the design of the rotor is a compromise to fulfil both functions to an acceptacle degree. In operation, the rotor moves the tailings over an aggressive surface thereby effecting rethreshing. The aggressive surface in some of the known tailings rethreshers extend only over a small arc so as to accommodate an inlet and an outlet opening. Thus the efficiency of such a rethresher is relatively low. In other arrangements, the aggressive surface is larger but, as already explained above, the rotor is incapable of moving all of the tailings over the entire surface, whereby the maximum efficiency is not realized.

Another limitation is that the tailings are supplied to the tailings rethresher rotor, either co-axially or in a direction generally parallel to the rotor axis. Thus the tailings are not evenly spread over the entire width of the rethreshing rotor and the associated aggressive surface which again reduces the efficiency. Also, such tailings rethreshers are unable to handle difficult crops such as wet and weed infested crops as well as crops mixed with wet sticky soil. Indeed, in these conditions crop material does no longer fluently enter between the adjacent rotor flights or paddles but instead thereof said material tends to stick in the inlet area of the rethresher as well as in the free spaces between the adjacent paddles of the rethresher rotor. This cause the capacity and the efficiency of the rethresher to drop considerably and eventually plugging may occur.

The foregoing illustrates limitations of the known prior art. Thus, it is apparent that it would be advantageous to provide an alternative directed to overcoming one or more of the limitations as set forth above.

SUMMARY OF THE INVENTION

In one aspect of the present invention, this is accomplished by providing a combine harvester rethresher including an auger, a rethresher rotor and an impeller for transferring crop material from the auger to the rethresher. A shaft, rotatably mounted in the harvester, carries the auger, the impeller and the rotor.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
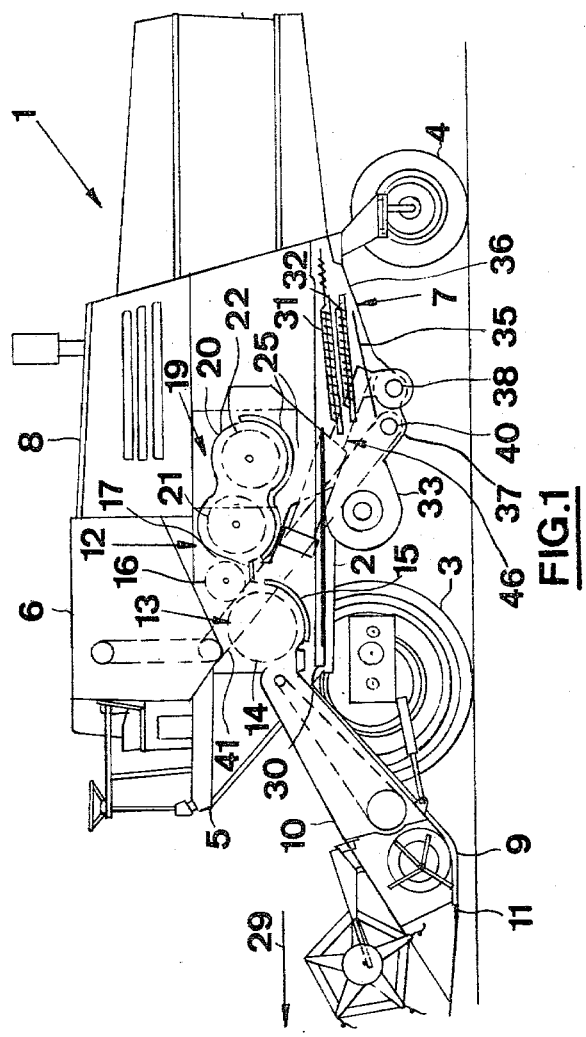
FIG. 1 is a side elevation illustrating an embodiment of a combine harvester of this invention.

With reference to FIG. 1, the combine harvester embodying the present invention is generally indicated at 1 and comprises a main frame or chassis 2 supported on a pair of drive wheels 3 and a pair of steerable wheels 4 (only one wheel of each pair being shown). Supported on the main frame 2 are an operator's platform 5, a graintank 6, a grain cleaning mechanism 7 and an engine 8. A conventional header 9 and a feed conveyor 10 extend forwardly of the machine. The main frame also supports a threshing and separating mechanism which is generally indicated at 12. A threshing portion 13 thereof comprises a conventional rotatable threshing cylinder 14 cooperable with a conventional stationary threshing concave 15, the operation of which is generally known in the art. Rearwardly of the threshing cylinder 14 and the associated concave 15 is provided a conventional deflector or so-called straw beater 16 with a cooperating beater grate 17. These components have substantially the same width as the threshing cylinder 14 and concave 15 and are arranged to deflect the straw mat issuing from the threshing mechanism.

Rearwardly of the straw beater 16 is provided a separating mechanism 19 which basically is composed of a single transversely extending casing or housing 20 with a pair of separator rotors 21,22 therein. The width of the separating mechanism 19 substantially exceeds the width of the threshing mechanism 13 whereby the outer ends of the separating mechanism 19 extend past the respective ends of the threshing mechanism 13. Preferably, the separating mechanism 19 has a width of about three meters.

The transversely extending separating rotors 21,22 are arranged in tandem inside the casing 20, part of which is defined by separator concaves 25. The rotors 21,22 are driven in the same directon 29 and comprise crop treating and crop conveying elements cooperable with the separating concaves 25 and operable in use to separate grain from the straw while conveying approximately half the straw mat in a first spiral path around both rotors 21,22 at the inner side of said casing 20 to one end of the separator mechanism 19 for discharge, and the remainder of the straw mat in an opposite spiral path and grain around both rotors 21,22 to the opposite end for discharge.

The cleaning mechanism 7 is disposed underneath the threshing and separating mechanism 12 with its longitudinal plane of symmetry coinciding with the plane of symmetry of said threshing and separating mechanism. The cleaning mechanism 7 has a width which substantially corresponds to the width of the threshing cylinder 14 and associated concave 15 and thus the separating mechanism 19 has opposite ends which extend substantially beyond the side edge of the cleaning device disposed therebelow. The cleaning device 7 is basically composed of a grain pan 30 for collecting grain separated in the threshing and separating mechanism 12, cleaning sieves 31,32 located rearwardly thereof, and a cleaning fan 33 disposed forwardly of the sieves 31,32 and below the grain pan 30. The cleaning sieves 31,32 and the grain pan 30 are mounted for oscillatory movement on the combine harvester chassis. A clean grain collecting chute 35 and a tailings collecting chute 36, which are generally known in the art, are disposed below the cleaning sieves 31 and 32 and are arranged to discharge clean grain and tailings received from the cleaning sieves 31,32 into a clean grain auger trough 37 and a tailings auger trough 38, respectively. The clean grain auger trough 37 extends transversely of the combine harvester and contains a clean grain auger 40 having a discharge end adjacent one side of the cleaning mechanism 7 to which collected grain is conveyed. A clean grain elevator 41 extends from said discharge end, alongside the threshing mechanism 13 and forwardly of the separating mechanism 19 to the grain tank 6.

Figure 2:
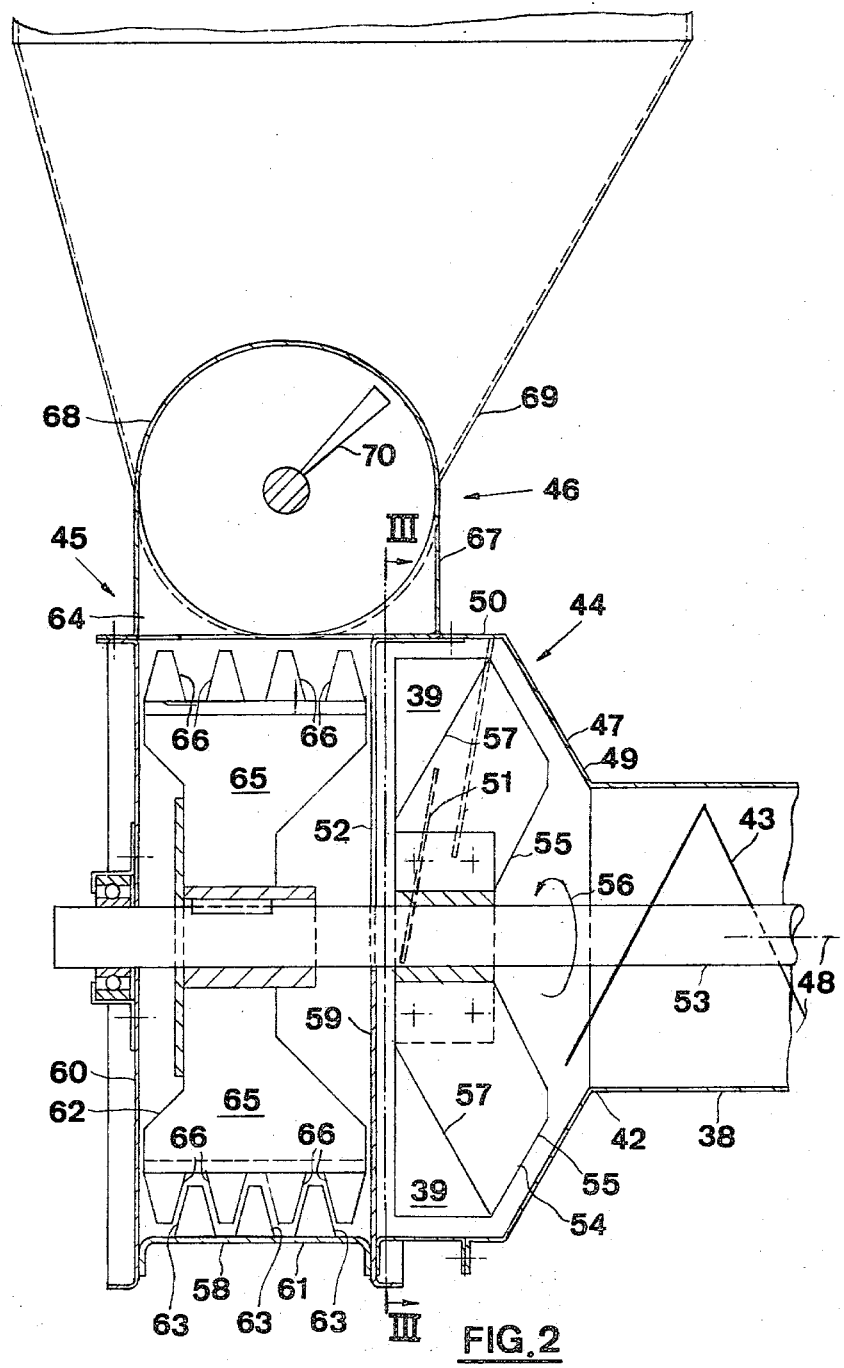
FIG. 2 is a cross-sectional view diagrammatically illustrating an embodiment of the rethresher of this invention.

The tailings auger trough 38, FIGS. 1 and 2 equally extends transversely of the machine and comprises opposite discharge ends 42 adjacent the opposite sides of the cleaning device 7. A tailings auger 43 is disposed in the tailings auger trough 38 and comprises auger flights which are wound in opposite directions from the middle of the cleaning device. Identical tailings transfer means 44 and tailings rethreshers 45 are provided at the opposite ends of the tailings auger trough 38. Each tailings rethresher 45 is coupled to an elevator conveyor 46 to be described further in more details. Only one tailings transfer means 44, one tailings rethresher 45 and one elevator conveyor 46 are shown in the drawings. As can be seen in the drawings, the tailings transfer means 44 and the tailings rethresher 45 extend coaxially with the auger axis 48 and the one adjacent the other.

Figure 3:
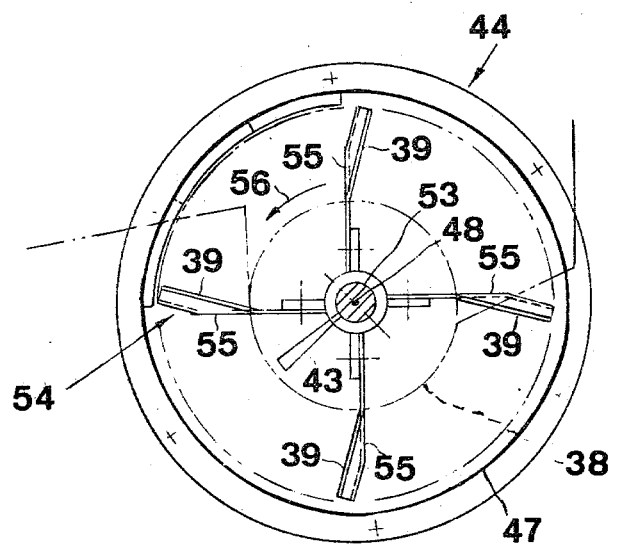
FIG. 3 is a cross-sectional view diagrammatically illustrating a portion of the rethresher of this invention viewed from line III—III of FIG. 2.

Each tailings transfer means 44 comprises a housing 47 which is arranged coaxially with the auger axis 48 and which has an outer diameter which substantially exceeds the diameter of the tailings auger 43. The housing 47 comprises a generally conical portion 49 which is coupled at its smaller diameter to the auger trough 38 and which is connected at its larger diameter to a generally cylindrical portion 50. A pair of spiral fins 51 are arranged on the inner side of the housing 47 and are disposed to direct tailings toward the rethresher inlet 52 in a spiral path. The tailings auger shaft 53 is extended into the tailings transfer means 44 and into the tailings rethresher 45 and carries an impeller 54 within the transfer means 44. The impeller 54, FIG. 3, is composed of generally radially outwardly extending impeller blades 55 with portions 39 thereof, adjacent the rethresher 45 and at the outer circumference of the impeller which are inclined rearwardly as seen in the direction of rotation 56. Said portions 39 are inclined rearwardly about wrinkle lines 57 which are directed outwardly away from the axis 48 and at an angle relative to and away from the rethresher 45 so that said portions help to direct material toward said rethresher 45.

Each tailings rethresher 45 comprises a generally cylindrical housing 58 with opposite end walls 59,60 and a generally cylindrical wall 61. A rethresher rotor 62 is mounted therein on the shaft 53. The rethresher inlet 52 is provided in the end wall 59 which also forms the partition wall between the tailings transfer means 44 and the tailings rethresher 45. The inlet is arranged eccentrically of the shaft 53 and spans a sector of no more than 180 degrees.

Downstream relative to the inlet 52 as seen in the direction of rotation 56, stationary aggressive rethresher means in the form of rethresher rasps 63 are mounted in a particular pattern on a section of the cylindrical wall 61 of the rethresher housing 58. Rearwardly thereof, as seen in the direction of rotation 56 is an outlet 64 which faces upwardly and which equally is provided in said cylindrical wall 61.

The rethresher rotor 62 comprises a number of generally radially outwardly extending vanes 65 which are secured to the shaft 53 and which carry at their outer ends side-by-side extending aggressive rethresher rasps 66 which are so disposed relative to the stationary rethresher rasps 63 that, in operation, the rotary rethresher rasps 63 move inbetween adjacent stationary rethresher rasps 66.

A tailings return conveyor 67 extends between the outlet 64 of each tailings rethresher 45 and an aperture in the combine side wall above the level of the grain pan 30. Each such return conveyor 67 is inclined upwardly in a forward direction and passes below an outer end of the separating mechanism 19. Preferably each return conveyor 67 comprises an auger tube 68 which is coupled a collecting chute 69 intermediate its ends. The diameter of the auger tube 68 downstream of the collecting chute 69, this means forwardly of said chute, as seen in the direction of operative travel, exceeds the diameter of the auger tube portion which is coupled to the rethresher 45. An auger 70 comprising two portions of different diameter is installed in the auger tube 68, with the portion having the larger diameter being positioned in the downstream auger tube section.

As the combine harvester 1 is propelled forwardly over a field, the crop material to be harvested is severed from the stubble by a sickle bar 11 on the header 9 and is conveyed by the header 9 and the feed conveyor 10 to the threshing and separating mechanism 12. The crop material is conveyed over the threshing concave 15 and grate 17 by the threshing cylinder 14 and the straw beater 16, respectively, while being threshed. The crop material (which may be wheat, corn, rice, soybeans, rye, rapeseed, barley, etc.) is thus rubbed and beaten whereby the grain, seed, etc. is loosened and separated from the straw stalks, coils or other discardable part of the crop material. In the separating mechanism 19, approximately half the straw mat is conveyed in a first spiral path around the rotors 21,22 at the inner side of the casing 20 to one end of the separator mechanism 19 for discharge onto the ground while that the remainder of the straw mat is conveyed in an opposite spiral path and again around said rotors 21,22 and at the inner side of the casing 20 to the opposite end of the separator mechanism 19 for discharge. During this spiral movement of the crop material, grain not yet separated in the threshing mechanism 13 and through the straw beater grate 17, is separated through the separator concaves 25. Together with grain, all sorts of impurities such as chaff, dust, short straw particles and tailings are equally separated from the straw mat in the threshing and separating means 12. Material, separated in the threshing mechanism 13, the straw beater 16 and associated grate 17, and the central portion of the separating mechanism 19, which are all disposed immediately above the cleaning mechanism 7, is dropped directly onto said cleaning mechanism 7. Material separated in the outer ends of the separating mechanism 19, which extend sidewardly beyond the side edges of the cleaning mechanism, is received in the collecting chutes 69 for directing it toward the associated auger tubes 68.

Most, if not all of the material directed to the cleaning mechanism 7 is received on the grain pan 30 thereof which conveys it stepwise in a rearward direction to the cleaning sieves 31,32. These cleaning sieves 31,32 and the cleaning fan 33 are arranged to discharge light impurities such as chaff and dust in a rearward direction onto the ground, while collecting clean grain on the clean grain collecting chute 35 for conveying it to the clean grain auger 40. Clean grain is further transported by the clean grain elevator 41 to the grain tank 6 on top of the machine for temporary storage therein.

The tailings (this means incompletely threshed ears) are separated from the clean grain on the one hand, and the discardable material on the other hand at the rearward end of the cleaning mechanism 7 and are collected on the tailings collecting chute 36 for conveying the same to the tailings auger 43. The operation of the threshing, separating and cleaning mechanisms as briefly described above is known in the art.

The tailings auger 43 is driven in the direction 56, and due to its oppositely wound auger flights, about half the amount of tailings is conveyed to one end and the remainder is fed to the opposite end for recycling. As the tailings transfer means 44, the tailings rethreshers 45, and the tailings return conveyors 67 on both sides of the combine are identical to each other, the operation of the components on one side only will now be described in more detail.

As the auger 43 feeds material into the tailings transfer means 44, the impeller 54 thereof immediately forces said material toward the outer circumference of the housing 47 which, as described, has a larger diameter than the tailings auger 43. As the material is impelled by the impeller 54 along the inner side of the housing 47, the fins 51 and the bent portions 39 of the impeller blades 55 lead it axially toward the associated rethresher 45 in a spiral path. This movement axially of the material is also induced to some degree by the shape of the conical portion 49 of the housing 47. The material is fed by the impeller 54 through the rethresher inlet 52 into the rethresher housing 58. It is thus clear that all tailings enter the rethresher housing at about one and the same location substantially at the outer circumference thereof. More precisely, all tailings are forcefully fed to the rethresher 45 substantially at the outer circumference thereof and forwardly of the stationary rethresher rasps 63 when seen in the direction of rotation 56. Thus all tailings are forcefully moved over the entire length of the aggressive surface of rasps 63,66 and hence no tailings are discharged prematurely. Also, as all tailings enter the tailings rethresher 45 at about its outer circumference, virtually none escape from the aggressive rethresher action by moving between the adjacent rethresher vanes. When entering the rethresher housing 58, the tailings are generally evenly spread over its width. The rethresher rotor 62 deflects the stream of tailings in the direction of rotation 56 and causes the same to pass between the stationary and the movable rethresher rasps 63 and 66 whereby they are submitted to a thorough rethreshing.

With the parts assembled as set forth above all components such as the threshing and separating mechanisms, for example, can be used to their maximum capacity for which they have been designed and without any undue risks of unevenly loading and/or overloading the same as a result of being supplied with tailings which would result in unacceptable grain losses. Thus, the threshing and separating efficiency of such machine is considerably improved. Also, the risk for unevenly loading the cleaning mechanism with tailings is reduced substantially as tailings are returned to the grain pan in substantially equal amounts from the opposite sides thereof and as the tailings are spread across the width of said grain pan. Furthermore, material separated in the outer portions of the separating means 19 is substantially evenly spread across the grain pan.

The efficiency of the separator tailings rethreshers is equally extremely high for several reasons. A major reason is the provision of the separate transfer means between each tailings auger portion and the associated rethresher which moves the tailings from the vicinity of the rotary axis of the auger to a spiral path with a diameter which is about the same as the diameter of the rethresher. Thereby the tailings enter the rethresher right at the diameter where rethreshing takes place so that rethreshing starts as soon as the tailings have entered the rethresher. Another reason may be seen in the fact that tailings are smoothly transferred from the auger to the rethresher whereby no hesitation in the flow of material occurs and uneven loading is avoided. In addition thereto, the tailings are more or less evenly spread across the full width of the rethresher, which is again helpful to improve efficiency.

Furthermore, all tailings enter at about the same location into the rethresher whereby all tailings are submitted to a rethreshing action of substantially the same length and aggressiveness as they are all passed over the full length of the stationary aggressive rethresher means. Thus substantially no tailings are discharged prematurely.

Yet, the tailings collecting auger, the transfer means and the rethreshers are very simple in design as they all extend coaxially the one next to the other. Thereby only one shaft with associated bearings etc. is required and the housings can be of sheet metal design. For the same reason, also the drive of the various components is very clean and simple. Finally, the tailings collecting auger, the tailings transfer means and the tailings rethreshers remain very compact and for all these reasons the arrangement is fairly cheap even though all main components are provided in duplicate, this means one set on each side of the cleaning mechanism.

Finally the tailings rethreshers according to the present invention are capable of handling all sorts of crops without any serious risks for plugging, even those which in many prior art designs invariably lead to problems such as, e.g., weed infested wet crops.

The foregoing has described a combine harvester rethresher. It is anticipated that aspects of the present invention, other than those specifically defined in the appended claims, can be obtained from the foregoing description and the drawings.

Having thus described the invention, what is claimed is:

1. A combine harvester rethresher comprising:
   an auger member rotatably mounted in an auger portion of said harvester;
   a rethresher rotor member rotatably mounted in a rethresher portion of said harvester;
   means for transferring crop material from said auger member to said rethresher rotor member, said means including an impeller rotatably mounted in a transfer portion of said harvester;
   a shaft rotatably mounted in said harvester, said shaft coaxially carrying said auger member, said first impeller and said rotor member; and
   said auger portion of the harvester having a first constant diameter, said rethresher portion of the harvester having a second constant diameter greater than the first diameter, said transfer portion including a sidewall extending from said auger portion radially outwardly to said rethresher portion, and said impeller of a construction sufficient for urging said crop material from said auger portion diameter radially outwardly toward said rethresher portion diameter.

2. The harvester of claim 1, wherein said rethresher portion includes a plurality of axially spaced, radially inwardly directed rasps in meshed relationship with a plurality of axially spaced radially outwardly directed rasps connected to said rotor.

3. The harvester of claim 1 including:
   means for directing tailings in a spiral path toward a rethresher portion, said means including spiral fins in the transfer portion.

4. The harvester of claim 1 wherein said impeller includes generally radially outwardly extending impeller blades having inclined portions adjacent the outer circumference of said impeller.

* * * * *